United States Patent [19]
Morley et al.

[11] 4,094,516
[45] June 13, 1978

[54] TRACK PIN ASSEMBLIES AND SEAL THEREFOR

[75] Inventors: James P. Morley, Arlington Heights; William J. Woods, Bensenville, both of Ill.

[73] Assignee: Chicago Rawhide Manufacturing Company, Elgin, Ill.

[21] Appl. No.: 795,569

[22] Filed: May 10, 1977

Related U.S. Application Data

[63] Continuation-in-part of Ser. No. 694,265, Jun. 9, 1976, abandoned.

[51] Int. Cl.² ............ F16J 15/38; F16J 15/54
[52] U.S. Cl. ............ 277/92; 277/165; 277/188 R; 277/215; 305/11
[58] Field of Search ............ 277/83, 85, 88, 89, 277/95, 70, 81 R, 91, 92, 165, 176, 177, 188 R, 188 A, 186, 189, 213, 215, 206 R; 305/11-13

[56] References Cited

U.S. PATENT DOCUMENTS

| | | | |
|---|---|---|---|
| 1,369,592 | 2/1921 | White | 277/215 |
| 1,532,961 | 4/1925 | Travers | 277/215 |
| 2,825,590 | 3/1958 | Sutherland | 277/165 |
| 2,871,039 | 1/1959 | Payne | 277/92 X |
| 3,218,087 | 11/1965 | Hallesy | 277/188 R X |
| 3,241,843 | 3/1966 | Hatch et al. | 305/11 X |
| 3,241,844 | 3/1966 | Morley | 277/92 |
| 3,437,385 | 4/1969 | Deli | 277/92 X |
| 3,829,173 | 8/1974 | Stedman | 305/11 |
| 3,841,718 | 10/1974 | Reinsma | 305/11 |
| 3,980,309 | 9/1976 | Dechavanne | 277/165 X |

FOREIGN PATENT DOCUMENTS

| | | | |
|---|---|---|---|
| 2,440,124 | 3/1975 | Germany | 277/165 |
| 446,836 | 5/1936 | United Kingdom | 277/83 |
| 926,216 | 5/1963 | United Kingdom | 277/165 |
| 1,150,645 | 4/1969 | United Kingdom | 277/188 R |

*Primary Examiner*—Robert S. Ward, Jr.
*Attorney, Agent, or Firm*—James T. FitzGibbon

[57] ABSTRACT

An end face seal especially adapted for use in severe service environments such as for sealing track pins of crawler type tractors. The seal includes a primary annular seal, having a radially extending flange portion for contacting a mating surface in face sealing engagement and an axially extending flange portion, and a secondary annular sealing member positioned in use about the axial flange portion. The cross section of the secondary annular sealing member is generally parallelogram-shaped in an unstressed condition.

13 Claims, 11 Drawing Figures

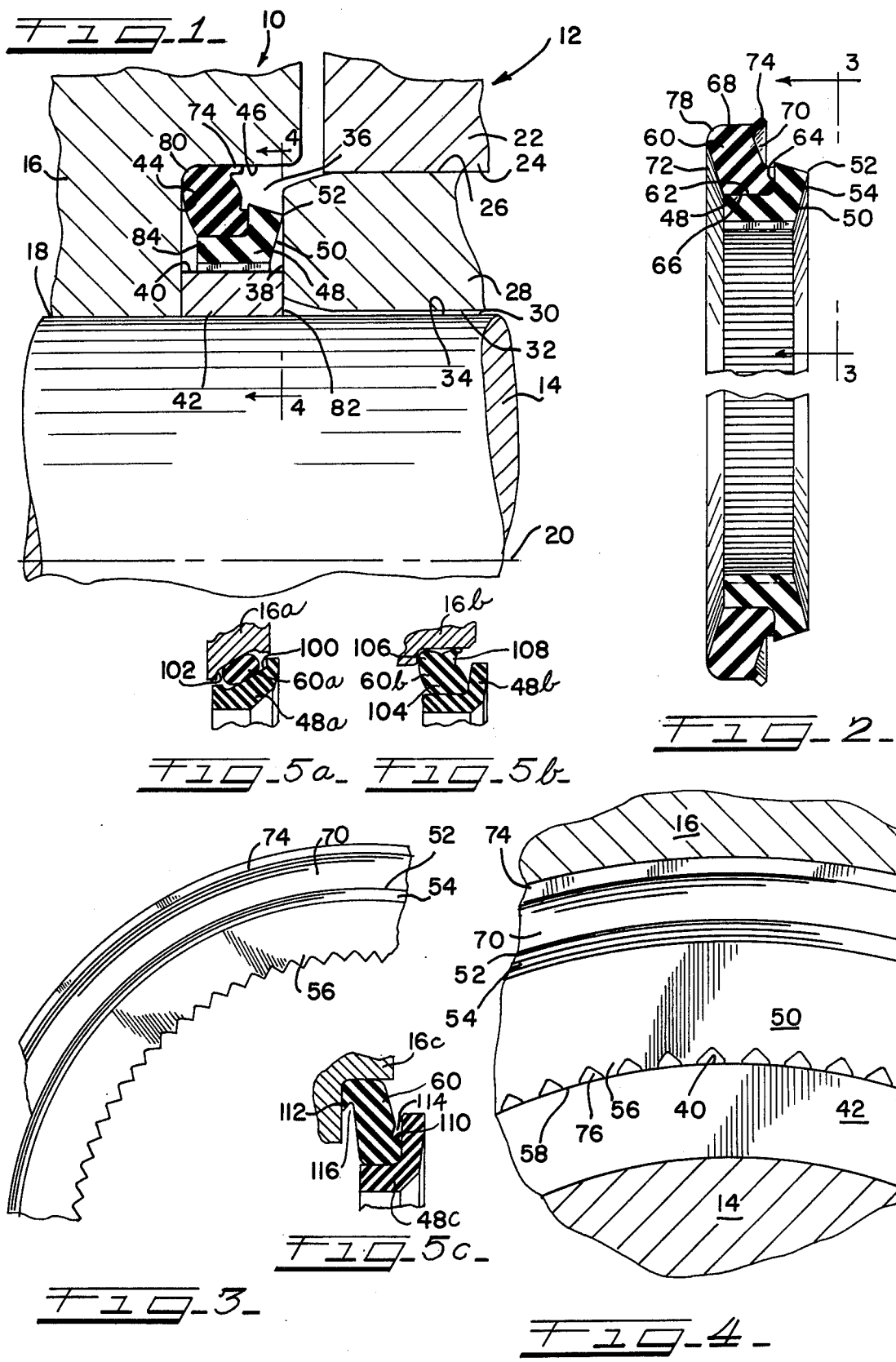

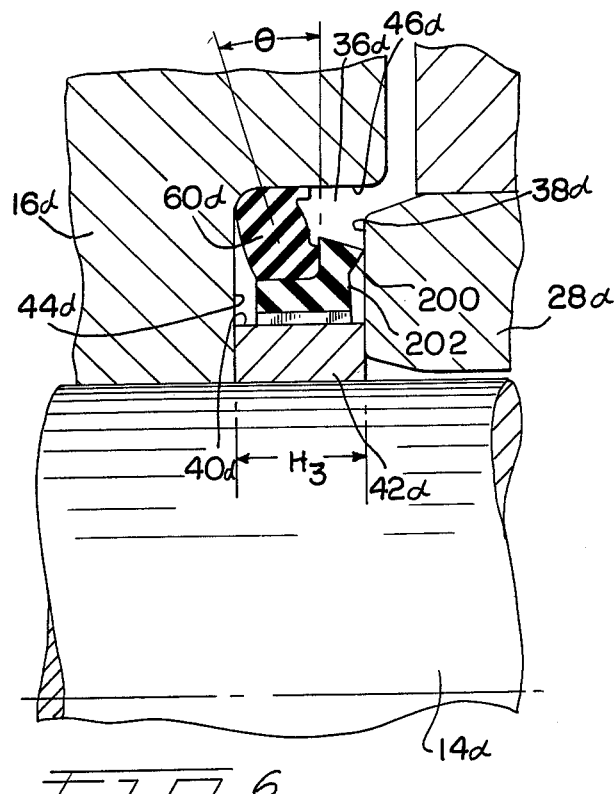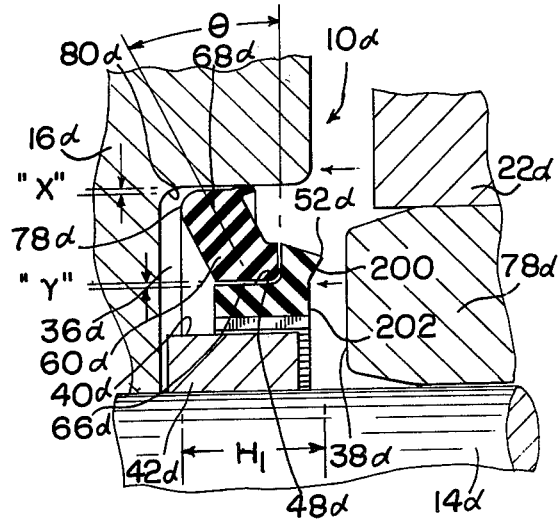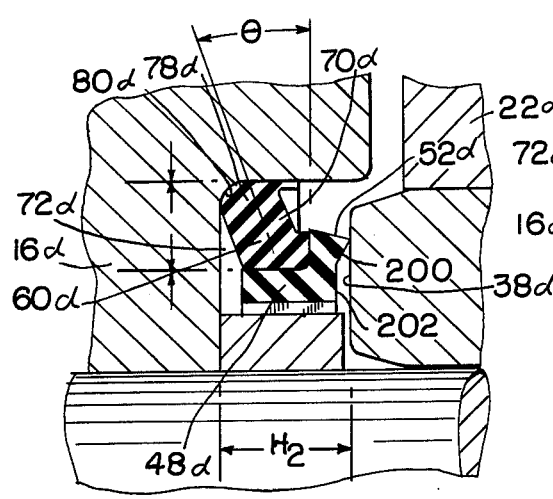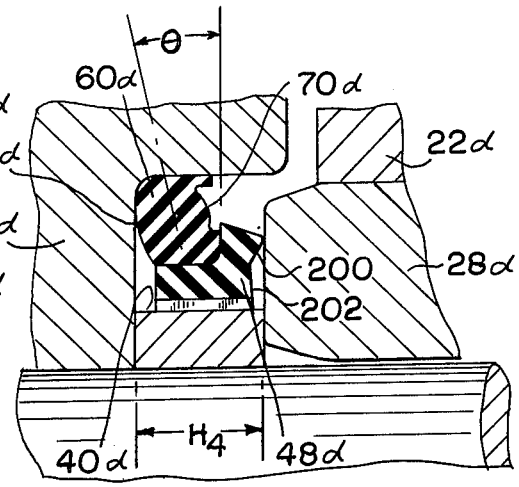

TRACK PIN ASSEMBLIES AND SEAL THEREFOR

This application is a continuation-in-part of Application Ser. No. 694,265, filed June 9, 1976, now abandoned.

BACKGROUND OF THE INVENTION

The present invention relates generally to seals, and more particularly, to seals adapted for specialized, severe service applications.

One application for which there have been a large number of seals proposed is that of the so-called track pins on crawler tractor equipment. Crawler tractors usually include a pair of tracks, and each track is in turn made up of inner and outer chains of track links. A large plurality of links, typically 30 to 40 links, are assembled into an endless chain, and two such chains are then trained over the front idler roller and the rear sprocket final drive as well as over a number of suspension track rollers and track-carrying idler rollers. The inner and outer links in each chain are held together by track pins and bushings which extend through openings at either end of the track links. Track shoes or grouser plates extend transversely between the respective links on the inner and outer chains. These shoes or plates form the surface which rests on the earth and ultimately supports and forms the traction for the vehicle. Thus, the right and left hand vehicle tracks each include a plurality of plates, with the plates extending between and joining the links in the inboard chain to the links in the outboard chain.

Because track vehicles are particularly designed for use under severe conditions, namely, mud, sand, grit, ice and snow, rocky terrain, etc., and because the track is the portion of the vehicle which comes into the most direct and frequent contact with these severe conditions, track pins and their bushings are subject to rapid wear.

Numerous track pin seal designs have been proposed, and a number of them have been proved successful in use to a certain extent; however, most crawler vehicles either use no track pin seals, or use rudimentary forms thereof, such as, for example, metal Belleville washers placed back to back, etc. Because each track contains a large number of pins, the expense of a seal is an important consideration in adopting it.

Considering the design and use environment of crawler tractors and the track links and pins and bushings thereof, an ideal track pin seal is one which will accommodate a relatively great degree of axial dimensional variation, whether such dimension occurs as a result of cumulative tolerances in manufacturing (so-called "tolerance stack up") or results from stresses and strains in use, and of course, eventual wear. As a corollary of the foregoing facts, it will be appreciated that metal Belleville washer type seals or other seals having a high axial spring rate are not highly desirable for an application of this type. An ideal track pin seal is one which has an axial spring rate which is moderate or fairly low, and yet which will generate an initial axial force which is sufficient to insure that the seal can successfully exclude water and grit and retain lube, even under conditions of minimum load. Because of the ever-increasing cost of machine parts, and the high cost of maintenance and labor, there has been and still is a great need for a really effective track pin seal.

According to the present invention, a seal is provided which provides most or all of the advantages of highly expensive prior art seals, and which does so at low initial cost. The seal of the invention applies proven principles, but uses structures and materials which are different from the prior art and which provide new operating characteristics and advantages.

In view of the need referred to above for an improved, highly reliable low cost seal for track pins and related applications, it is an object of the present invention to provide a novel seal for track pins and similar applications.

Another object of the invention is to provide a track pin seal using a new combination of structures and materials adapted to provide reliable, long term life with low initial cost and virtually no maintenance.

Another object of the invention is to provide a seal which utilizes a novel arrangement of an end face, mating surface, and axial loading member therefor.

A still further object is to provide an end face seal using two different elastomeric materials, the softer of which provides an axial end load application and torque transmission capability in all types of weather conditions, and the harder of which provides outstanding wear resistance, with the softer element also providing a secondary or relatively static seal between itself, the harder member and the part of the track link in which it is received.

Another object of the invention is to provide a seal wherein the primary seal ring receives a radial compressive load from the secondary seal member, and which resists undue radial deformation by reason of having portions of such primary seal ring engage a part of the track pin itself.

A still further object is to provide a track pin seal in which the primary seal member is supported by a portion of the track pin, and wherein the seal ring includes means permitting passage of oil from a reservoir area to the interface between the primary seal ring and the mating part.

Still another object is to provide a track pin seal having a secondary seal member of generally annular form, having a cross section of a generally parallelogram-shaped configuration.

Another object is to provide a track pin seal having two pieces and adapted to be supported by a track pin or a member associated therewith, with the so-called secondary seal member being adapted to transform an axially applied load into a combination of increased radial compressive load and a partially reduced axial load.

A further object is to provide a seal unit having two pieces, one of which comprises a primary sealing ring of a tough, but resilient elastomeric material having excellent abrasion resistance, and the other of which excellent abrasion resistance comprises a secondary seal ring made from a softer elastomer, with the second ring being adapted to apply the loading forces necessary to create an effective sealing action.

Yet another object is to provide a seal which will survive a severe service environment while being made entirely of elastomeric materials.

A still further object is to provide a seal which will constitute an improvement over existing track pin seals, while at the same time providing greatly reduced costs.

Another object is to provide a seal unit in which the primary sealing ring includes an end face surface having a generally radially extending element and a frustoconical element tapering radially outwardly and toward the member with which the ring will cooperate to form a primary, dirt-excluding seal.

The foregoing objects and advantages of the invention are achieved in practice by providing a seal unit having a generally annular secondary seal and force applying member of a characteristic shape, and a primary seal ring of a stiff, elastomeric material having a generally L-shaped seat for receiving the secondary member, and an axially directed end face portion adapted to contact a part of the track pin mechanism to be sealed, with the primary seal ring including plural axial passages extending between the axial ends of the primary seal ring to permit flow of lubricant therethrough even under difficult conditions.

The exact manner in which these and other objects and advantages are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a vertical sectional view, with portions broken away, showing the track pin seal of the invention in position of use;

FIG. 2 is a fragmentary vertical sectional view of the seal of the invention prior to installation, and showing the axial lubricating passages on the inside diameter of the primary seal ring;

FIG. 3 is an enlarged fragmentary front elevational view of a portion of the seal of FIG. 2, taken along lines 3—3 thereof;

FIG. 4 is a further enlarged front view of the seal of FIG. 1, taken along lines 4—4 thereof;

FIG. 5a is a vertical sectional view of a seal having a modified cross sectional shape;

FIG. 5b is a vertical sectional view having a further modified cross sectional shape;

FIG. 5c is a vertical sectional view having a still further modified cross sectional shape;

FIG. 6 is a fragmentary, vertical sectional view of a modified form of seal made according to the invention and showing the seal in a normal, installed position of use;

FIG. 7 is a fragmentary, vertical sectional view of the form of seals shown in FIG. 7, showing the seal just prior to complete installation thereof;

FIG. 8 is a vertical sectional view of the seal of the invention showing the seal installed and positioned in a lightly compressed position of use; and FIG. 9 is a vertical sectional view of the seal of FIGS. 6-8 and showing the seal in the fully compressed position thereof.

DESCRIPTION OF THE PREFERRED EMBODIMENTS OF THE INVENTION

While it will be understood that seals made according to the present invention may be useful in a number of environments, the invention will be particularly described with respect to a preferred embodiment wherein the sealed medium is oil, e.g. EP 90 oil, and wherein the application is that of the track pins in the endless track of links making up the tracks of a crawler type tractor.

Referring now to FIG. 1, the seal of the invention, generally designated 10, is shown to be in an installed position within a track link assembly generally designated 12.

FIG. 1 shows a cylindrical track pin 14, having an end cap or like part 16 which is tightly secured, as by a press fit, along the interface 18 between an inner diameter of the end cap 16 and the outer diameter of the track pin 14. These parts are arranged so as not to undergo movement relative to each other. In practice, the end cap 16 typically constitutes the leading portion of one track link, while the trailing portion of the same link would be press fit over a bearing or bushing which in turn would be free to rotate with respect to the following track pin.

In FIG. 1, a counterpart end portion 22 of a preceding track link is shown, with the link 22 having a radially inwardly directed wall portion 24 defining an opening for receiving the outer diameter 26 of a track pin bushing 28. A slight working clearance 30 is shown to exist between the inner diameter 32 of the track pin bushing 28 and the outer diameter 34 of the track pin 14, the center line axis which is shown at 20.

Accordingly, the track link 22 and the bushing 28 are pressed together and do not move with respect to each other, but instead move as a unit with respect to the track pin 14. The end cap portion 16 of the preceding link is fixed to the pin 14. This permits the pin 14 to oscillate with respect to one end of the track link, thus permitting the track as a whole to articulate at each link joint as the chain of links travels over the radii defined by the front and rear sprockets of the track vehicles.

Referring now to the working environment of the seal, a seal-receiving cavity 36 is shown to be defined in part by a mating surface 38 which is an annular, radially extending, axially directed end face portion of the bushing 28. The radially outwardly directed face 40 of a spacer ring 42 defines the inner diameter of the cavity 36, which is further defined by a radially extending end wall 44 and an axially extending wall 46, the latter two walls defining the seal-receiving counterbore in the end cap 16 of one of the track links. Disposed within the cavity 36 is an annular primary seal ring 48 which includes a slightly inclined end face surface 50 terminating at an edge 52. The margin 54 lying radially inwardly of the edge 52 will form the seal band or sealing surface which actually engages the mating surface 38 on the bushing 28 to create the primary seal. The inner diameter of the ring 48 comprises a plurality of teeth or serrations 56 (FIGS. 3, 4) which in use have their inner surfaces 58 snugly engaging the outer diameter 40 of the spacer 42. A seat for receiving a secondary sealing member 60 is formed in the primary sealing ring by a generally axially extending surface 62 and a generally radially extending annular surface 64.

The elastomeric secondary seal member 60 has a body which is generally parallelogram shaped in cross section and which includes radially inner and outer axially extending surfaces 66, 68 and generally inclined front and rear surfaces 70, 72. The sets of surfaces 66, 68 and 70, 72 are generally parallel to each other in the unstressed or unloaded condition of the seal. An outwardly and upwardly extending flange 74 of small cross section is formed around the radially outer forward edge of the body of the secondary seal member 60. This flange 74, which is shown to be radially confined and deformed into a forwardly extending installed condition of the seal (FIG. 1) aids in mounting the unit, as will appear.

Referring now to the preferred composition of the elements of the present seal, the secondary seal ring 60 is preferably made from a relatively soft synthetic rubber material, the chemical composition of which is chosen based on the intended application of the seal. For sealing oil in track pin cavities, a nitrile ("Buna N") rubber which undergoes relatively small change of stiffness with temperature and which has a type "A" Durometer of about 50–60 is preferred. Other suitable rubber materials, including those of different chemical composition and physical properties are well known to those skilled in the seal art.

Referring now to the primary seal ring 48, this element is preferably made from a tough, abrasion resistant elastomer such as a polyurethane rubber, preferably a material with a 90–95 Durometer (Shore A) hardness. While several different compositions may be suitable for this purpose, one specific example of a composition which has been found useful for this purpose is a rubber which may be described as the reaction product of a polyether glycol such as poly (1,4-oxbutylene) glycol with stoichiometric excess of a mixture of the 2,4- and 2,6- isomers of tolylene diisocyanate, which forms a prepolymer having a molecular weight of from about 1500 to about 3000. This prepolymer is then cured with a reactive diamine such as methylene-bis-orthochloroaniline. The cured elastomeric polymer has a 90–95 Durometer (Shore A) hardness and a specific gravity of about 1.16. The composition may also be filled or modified in a manner known to those skilled in the rubber seal-making and rubber compounding arts.

Referring now to the installation of the seal, the rubber ring 60 is slipped over the primary seal ring 48 with the oppositely directed surfaces 62, 66 on the primary and secondary rings respectively engaging each other. This fit may be a loose or moderately snug fit, and in some cases may even require a slight stretching of the secondary ring 60. Next, the two parts thus assembled are placed into the counterbore or cavity 36, with the teeth 56 separating the axial grooves 76 being either just spaced apart from or slightly engaging the outside diameter 40 of the spacer 42. The flange 74 engages the surface 46 upon initial installation to locate the secondary seal ring 60 in the counterbore 46; the ring 60 is pushed fully into the counterbore until the radially outer margin of the surface 72 meets the end wall 44 of the cavity 36.

In the construction shown, the radiused portion 78 of the seal ring 60 engages a correspondingly shaped radius 80 formed in the end cap 16. At this point, with no axial load being applied, the surface 68 on the outside diameter of the ring 60 may be spaced slightly apart from or may very lightly engage the counterbore surface 46; the flange 74 keeps the ring 60 centered within the cavity, however.

Next, the end cap and associated track pin 14 and spacer 42 are assembled with the remainder of the track assembly so that the pin 14 is received within the bushing 28 pressed in the leading edge opening within the trailing or following track link 22. As the assembly is completed, the edge 52 of the ring 48 engages the end wall or mating surface 38 of the bushing 28, slightly distorting the margin 54 of the ring 48 so as to form a seal band 54 of a measurable radial width. The extent to which the bushing 28 may move to place an axial load on the seal assembly is determined by the axial width of the spacer 42. When the end surface 82 of the spacer engages the mating surface 52 of the bushing 28, assembly is complete.

Axial compression of the seal unit is achieved by distorting the resilient secondary seal ring 60. When it is axially compressed, the seal ring 60 tends to bulge at its sidewalls 70, 72 (FIG. 1) and tends to become more flat and less frusto-conical, that is, its axial extent is shortened and its cone angle is rendered more planar. A consequence of this action, aside from bulging of the sidewalls, is that the radial compressive load on the primary seal ring 48 increases greatly. This permits the inner ring to be tightly gripped by the outer ring and renders the secondary seal 60 capable of transmitting considerable torque.

In the foregoing respects, the action of the seal of the invention is similar to that of the seal described in U.S. Pat. No. 3,241,843. However, in seals described in that patent, and in other similar seals, the primary sealing ring was constructed from a stiff, thick metal material capable of accepting very high radial compressive loads without distorting significantly. In the instant case, while the primary seal ring 48 is made from a much harder, stiffer material than is the ring 60, the ring 48 is still made from an elastomer and in its free or unsupported state cannot absorb compressive loads of the required order without deflecting inwardly to an undesirably great extent. Therefore, according to the present invention, the inner diameter of the ring 48 includes the teeth 56 which engage and rest upon a metal surface, namely, the spacer 42, thus receiving the requisite degree of support against undue radial deflection.

Before the seal is installed, the teeth 56 may be sharp, as shown in FIG. 3. However, when the seal is axially compressed, resulting in the creation of the radial compressive loads referred to above, the teeth 56 are distorted into the form shown in FIG. 4. However, because the passages 76 remain open even after application of strong radial compressive loads, a substantial volume of oil may be kept within the sealed region. As shown in FIG. 4, a portion of each passage 76 is actually formed by the outside diameter 40 of the spacer 42. The entire volume occupied by the passageways, as well as the volume in the cavity 84, is available for reception of oil, as is the working clearance area 30 between the track pin 14 and the bushing 28.

In the track pin environment, metal rings of the requisite quality and shape, together with the spring members required to make an effective seal would be prohibitive in cost. By combining the advantages of a tough rubber primary seal with a stiff, internal radial support which actually comprises a part of the assembly being sealed, and by providing oil passages to an oil reservoir of significant volume, a highly effective seal action is provided. Manufacturing the secondary seal 60 of a soft rubber provides a low axial spring rate which permits substantial axial movement of the primary seal ring to take place without developing axial loading forces which are too high or too low. In the event the spring rate of the seal ring is too high, compression thereof in an axial direction creates sealing forces which are so high that the seal wears out rapidly; if the forces are too low, the proper seal action will not be achieved.

Therefore, a low spring rate must be used to achieve a combination of a load which is sufficient to create an effective seal even when the secondary ring 60 is only slightly compressed, and which is not too high when the ring is compressed fully within design specifications. Although the rubber materials described herein are very well suited for providing these characteristics, other rubbers which also perform satisfactorily are known to those skilled in the seal art.

Combination spring and secondary seal members having a cross-section of the type illustrated have proven very effective for this application. Such rings may be described as frusto-conical rings having a generally parallelogram-shaped cross-section. However, it will be undestood that other equivalent shapes may function equally well; these equivalents include shapes which include parallelograms inscribed therein. In addition, other shapes are known which take into account the fact that rubber, when fully confined, is substantially incompressible, and that accommodation must therefore be made for the secondary seal unit to distort so as to place both an axial load and a radial compressive load on the primary seal ring when the primary ring is moved so as to place an axial load on the secondary member.

In addition to the basic shape just described, the secondary seal ring may also include mounting flanges, so-called "barbs" spaced about the circumference of the secondary seal ring for this purpose, or other additions to the ring.

One of the features of the present invention is the ability of the secondary member 60 to apply an axial load through the primary member directly to the mating surface. Where the primary ring is steel or other rigid material, high axial loads can be transmitted to the end face of the primary seal ring even if there is not complete, or even substantial, contact between the leading edge of the secondary seal member and the rear surface of the radially extending flange on which the seal band is formed. Thus, if the outer diameter of the axial flange is strongly gripped by the rubber ring, and if the radial flange is pushed axially inwardly, resistance to deformation on the part of the secondary ring will provide a significant axial load. In such cases, while the leading surface of the secondary member generally engages a major part of the rear surface of the radial flange, this is not a strictly necessary condition for the transmission of a significant axial load.

However, in the present invention, the primary seal ring, although stiff, is still elastomeric in nature, and therefore the portion of the primary seal ring lying behind the intended seal band area should be backed up by contact with the rubber secondary seal member, even when the secondary ring is in a relaxed or unstressed condition.

Accordingly, by reference to FIGS. 1 and 2, it will be noted that a fillet or wedge-shaped portion of rubber forms the lower part of the leading edge of the secondary member which is otherwise substantially parallelogram shaped in cross section when the secondary member is in a relaxed or unstressed condition.

The invention has been illustrated with respect to a form of seal where one elastomeric ring and one relatively harder primary ring are disposed in the seal cavity. Although more expensive, two such units may be used within a single seal cavity. In this case, the two units are disposed in opposed series relationship or so-called "mirror image" form.

It has been discovered that, in use, the present invention provides a highly satisfactory seal which is capable of applying an axial load to the primary seal ring which is sufficient to effect a tight seal against an associated mating surface, and to maintain the seal throughout a relatively wide range of axial movement or end play. In this condition, the spacer 42 limits the axial inward movement of the bushing 28, while a counterpart spacer 42 on the opposite end of the track pin prevents undue axial movement in the other direction. The radial force establishes a firm mechanical connection between inner surfaces of the end cap and the primary seal ring. The primary ring is not unduly compressed radially because it is supported by the outer surface 40 of the spacer 42. This outer surface is lubricated to permit axial movement of the primary member.

The end face 50 of the primary ring 48 is slightly dished or angled so that the entire surface is not in contact with the end face 38 of the bushing 28. The toughness and wear resistance of the primary ring provides extended life in use at low cost. The softer material and the characteristic shape of the secondary ring provide an excellent secondary seal, a high torque transmission capacity and the ability to distort controlably so as to provide a desirable spring action in which an applied axial load is made to appear as a combination axial load and increased radial compressive load. Seals according to the invention may be economically enough to be adopted on a mass scale to track pin application.

Referring now to FIG. 5a, a form of seal generally similar to that shown in FIGS. 1–4 is illustrated. However, it will be noted that, in the embodiment of FIG. 5a, the primary seal ring 28a includes an inclined, radially outwardly and rearwardly directed seating surface 100. The secondary sealing ring 60a is of an O-ring configuration when relaxed, and is slightly toric or somewhat flattened in operation. A radially inwardly and forwardly directed seating surface 102 is formed in the end cap 16a.

The two oppositely directed surfaces 100, 102 form frusto-conical ramps on which the O-ring secondary seal 60a may move as radial and axial loads are placed on the ring. Aside from the differences in cross sectional shapes of the members just described, including the tapered or inclined wall 102 forming a countersink or seal-receiving surface in the end cap, the seal elements 48a, 60a are essentially the same, and function essentially the same as their counterparts in FIGS. 1–4. The elastomeric materials from which the seals are made may also be the same or similar as their counterparts.

FIG. 5b shows another form of seal unit wherein the primary seal ring 48b and the counterbore in the end cap 16b are the same as their counterparts in FIGS. 1–4, but in which the cross sectional shape of the secondary seal member 60b is different. In particular, the radially inner portion 104 of the secondary member 60b is wider than the radially outer end 106 thereof. A plurality of deformable mounting spikes or barbs 108 are provided to insure proper initial seating or positioning of the ring 60b in the end cap counterbore. In use, the cross section of the secondary member 60b may deform somewhat and, as a consequence, the member 60b operates in generally the same manner as its counterpart 60 in FIGS. 1–4.

In the form of invention shown in FIG. 5c, the cross section of the secondary sealing end driving member 60c is also somewhat modified so as to include small feet 110, 112 at the inner and outer radial ends respectively of the ring 60c. In the relaxed position of the ring 60c, the small notches 114, 116 appear to exist in the cross sectional view of the ring member 60c between the ends of the feet 110, 112 and the body of the member 60c. In the actual seal, these notches 114, 116 form an annual groove around most or all of the body of the secondary member 60c. As an axial compressive load is applied, the member 60c distorts so that most or all of the space seen in the notches 114, 116 is closed up and portions of the feet 110, 112 contact the body of the member 60c in a snug relation.

The operation of the form of seal shown in FIG. 5c is essentially the same as that of its counterpart shown in FIGS. 1–4. The materials from which this form of seals are made are also the same as, or similar to, those from which the counterpart members of the earlier described forms of seals are made.

Referring now to FIGS. 6–9 there are shown a modified form of seal embodying the present invention and certain details on installation of the seal and components in use. FIG. 6 shows the seal installed at a typically specified "operating height"; FIG. 7 shows the seal being disposed in the counterbore just before installation is completed; FIG. 8 shows the seal at maximum "operating height"; and FIG. 9 shows the seal at minimum "operating height" or maximum compression.

In the seal art, seals for track pins, track rollers and the like, are referred to as having a "operating height" which, in relative dimensions, is indicative of the degree to which the seal assembly is compressed axially. Maximum operating height occurs when the axial extent of the bottom or shoulder of the counterbore is spaced axially farthest from the portion of the primary seal ring member which forms the seal band. Minimum operating height occurs when the seal band-forming portion of the primary member lies closest to the shoulder or bottom portion of the counterbore. A specified or typical operating height lies between these two extremes, and is a height which is sought to be, but is not always, achieved in practice. The variations in operating height occur because of the working clearances required to permit operation of the machine, as well as because of the need for reasonable manufacturing tolerances. The seal accommodates changes in working height primarily by compression of the secondary or spring member and, to a much less extent, by deflection or compression of portions of the primary seal member.

If a seal is operated at more than the maximum operating height, it may fail to seal because the assembly is not compressed axially in an amount sufficient to create the required end or axial loading force on the seal band; in other words, the two primary sealing members which rotate relative to each other are not being urged toward each other with the requisite force to create a lubricant-retaining, dirt-excluding seal. On the other hand, when the seal is compressed beyond the permissible minimum working height, compression of the secondary member is at a maximum, and further compression will create such extreme axial forces that the seal parts will extrude the film of lubrication from between them, and will then rapidly fail in use by reason of excessive friction and the high temperatures typically accompanying such conditions.

Referring now again to FIGS. 6–9, a typical installation of the modified form of seal is there shown to include a spacer 42d, the bushing 28d, having an end face mating portion 38d and a counterbore with a radially extending wall portion 44d and an axially extending wall 46d. The seal receiving cavity 36d is defined by the three surfaces just referred to, in addition to the radially outwardly directed face 40d of the spacer 42d.

As shown in FIG. 7, when the seal assembly 10d is about to be installed within the seal receiving cavity 36d the primary and secondary annular member 48d, 60d are positioned within the counterbore or seal-receiving opening 36d. At this point, the radially outwardly directed, axially extending surface portion 68d and the radially inwardly directed, axially extending surface 66d are parallel to each other but spaced by clearances "X" and "Y" respectively, from the counterbore surface 46d and from the radially outwardly facing, axially extending surface 62d on the primary seal ring member 48d.

Typically, these "X" and "Y" clearances would be of the order of a few thousandths of an inch. In one preferred embodiment, the clearance "Y" is substantially zero or even a light interference fit, while clearance "X" is 0.020 – 0.060 inches. In such a case, the light interference fit between the surfaces 66d and 62d serves to insure that the two rings 48d, 60d may be handled as a unit. An important feature of the invention is that, when the seal is in this position, the molded rubber part 60d and 48d are in a substantially relaxed or as-molded condition and, the end face 38d of the bushing 28d is spaced from the seal band portion or edge 52d of the primary member. In this as-molded condition, there will be a certain, predetermined angled $\theta$ lying between a radial plane and the frusto-conical extent of the body secondary seal member 60d. For purposes of illustration, such angle $\theta$ might be 30°.

As shown in FIG. 8, installation is accomplished by moving the bushing 28d and its related portion 22d of the track link toward the end cap 16d. During this installation, the bushing 28d slides axially relative to the track pin 14d. FIG. 8 shows that, as the edge portion or seal band 52d of the primary seal ring 48d engages the mating surface 38d on the bushing 28d and is moved axially thereby, the frusto-conical secondary seal member 60d is moved so as to snugly seated with the radiused portion 78d thereof engaging the correspondingly radiused portion 80d of the counterbore 36d within the end cap 16d. Further compression generates sufficient axial load for an effective seal by distorting the secondary member 60d in compression and reducing the angled $\theta$ slightly, to 20° or 25°, for example.

When the secondary seal member 60d is in the position shown in FIG. 8, the front and rear surfaces 70d, 72d thereof are inclined with angle $\theta$ but are parallel to each other and not measurably bulged or distorted.

FIG. 6 shows the seal in a typical or "specification" position of use and thus shows the surfaces 70d, 72d to be bulged somewhat. FIG. 9 shows the seal at a so-called minimum height, and shows that the front and rear walls or surfaces 70d and 72d are bulged significantly, and that the entire leading edge, which in the embodiment of FIGS. 6–9 is a two-element surface consisting of a radially inner, generally planar portion 200 and a radially outer, generally frusto-conical portion 202, is inclined rearwardly and radially outwardly. In other words, the inner, normally planar surface 202 is inclined radially outwardly and toward the bottom of the counterbore, while the frusto-conical surface portion 200 which terminates in the sealing edge 52d is inclined somewhat less forwardly than it would be under a lower axial load.

By noting the indications of axial extent or height $H_1$, $H_2$, $H_3$, and $H_4$ in FIGS. 6–9, an illustration is given of the meaning of terms just used concerning installed height or "working height". The dimension $H_1$, form the leading edge 52d of the primary member 48d to the rear edge or rounded corner portion 78b of the secondary seal member 60d is shown in FIG. 7 to be the greatest height. This maximum height is the height of the unit as it is manufactured and before installation. $H_2$ shows the maximum installed height, which is slightly less than the manufactured height, inasmuch as some axial load has been applied. $H_3$ is a typical specification or installed height, under a moderate or intended working load. $H_4$ is the shortest or minimum installed height and is the height attained under the highest permitted load.

Referring now to the feature of the invention which resides in the articulated or two-segment surface 200, 202, on the leading or sealing surface edge of the radial flange of the primary seal member 48d, this two-segment surface construction has proved advantageous in use. This construction permits a slightly greater effective angle to be achieved between the surface 202 and the surface 38d than can be achieved between counterpart surfaces 50 and 38 in the embodiment of FIGS. 1–5. When the seal operates through a range of low working heights, including those such as shown in FIG. 9, the provision of the frusto-conical portion 22 allows the angle between the surface 200 and the end face surface 38d of the bushing 28d to be sharp enough to create a good seal.

We claim:

1. An end face seal unit for use in severe service environments, said assembly comprising, in combination, a primary annular sealing ring having a generally axially extending flange portion and a generally radially extending flange portion, said axial flange having respective inner and outer diameter surfaces and said axial flange having generally radially extending front and rear surface portions, said front surface portion of said radial flange having a portion thereof adapted to engage a mating surface in snug end face sealing engagement therewith when urged axially toward said mating surface, and a secondary sealing member of generally annular form, said secondary member including generally axially extending inner and outer diameter surfaces and front and rear surface portions, said front and rear surfaces being inclined forwardly and inwardly such that said secondary member, in the unstressed condition thereof, has a generally parallelogram shaped cross section, said inner diameter of said secondary member being received in use over said outer diameter of said axial flange portion of said primary seal ring, with at least a portion of said front surface of said secondary seal member engaging at least a portion of said rear surface of said primary seal member, said primary member being made from a relatively stiff but resilient first elastomeric material, and said secondary member being made from a second resilient elastomeric material which is substantially less stiff than said first material, said axial flange portion of said primary member being adapted to be supported in use on the inner diameter thereof by a portion of an element being sealed thereby.

2. A seal unit as defined in claim 1 in which said generally radially extending front surface of said radial flange is inclined slightly forwardly as it extends outwardly.

3. A seal unit as defined in claim 1 in which in the unstressed condition thereof, a radially inner portion of said front surface portion of said secondary member extends forwardly of the remainder of said front surface portion, and lies substantially parallel to said rear surface portion of said radial flange on said primary seal ring.

4. A seal unit as defined in claim 1 in which said inner diameter of said secondary seal member includes means at least partially defining oil passages extending axially from said front surface portion of said radial flange to the rear of said axial flange.

5. A seal unit as defined in claim 1 in which said inner diameter surface of said axial flange includes a plurality of radially inwardly directed support projections having circumferentially spaced apart inner ends, said inner ends being adapted, in use, to engage a portion of said element being sealed, whereby said inner diameter is supported against substantial radially inward movement, and whereby the spaces between said support projections define, in use, oil passages extending axially between said front surface of said radial flange and the rear surface of said axial flange.

6. A seal unit as defined in claim 5 in which said support projections are in the form of serrations, said inner ends thereof being axially extending teeth, said inner ends being adapted to be flattened into substantial circumferential engagement with said portion of said sealed element under application of a radial compressive load to said primary seal ring by said secondary member.

7. A seal unit as defined in claim 1 in which said first elastomeric material comprises a urethane elastomer.

8. A seal unit as defined in claim 1 in which said second elastomeric material comprises a nitrile rubber.

9. A seal unit as defined in claim 1 in which said secondary member, in use, is deformed under the application of an axial load to said seal such that said front and rear surfaces thereof bulge outwardly, said parallelogram shaped cross section being also distorted so that said inner and outer diameter surfaces thereof are moved toward a position of radial alignment.

10. A combination track pin and seal assembly, said assembly including a track pin, a first link portion secured to said track pin and a second link portion journaled for oscillation with respect to said pin, a bushing surrounding a portion of said pin and received within said portion of said second link, said bushing including a radially extending, axially directed end face mating surface, a seal-receiving counterbore disposed in said first link, an annular spacer element surrounding said pin and extending axially between an end face of said counterbore and said end face of said bushing, the outer diameter of said spacer, said bushing end face and said counterbore defining a seal-receiving cavity, and an end face seal unit disposed within said cavity, said unit including a primary annular sealing ring having a generally axially extending flange portion, said axial flange having respective inner and outer diameter surfaces and said axial flange having generally radially extending front and rear surface portions, said front surface portion of said radial flange having a portion thereof engaging said mating surface on said bushing in snug end face sealing engagement therewith when urged axially toward said mating surface, and a secondary sealing member of generally annular form, said secondary member including generally axially extending inner and outer diameter surfaces and front and rear surface portions, said front and rear surfaces being inclined forwardly and inwardly such that said secondary member, in the unstressed condition thereof, has a generally parallelogram shaped cross section, said inner diameter of said secondary member being received over said outer diameter of said axial flange portion of said primary seal ring, with at least a portion of said front surface of said secondary seal member engaging at least a portion of said rear surface of said primary seal member, said primary member being made from a relatively stiff but resilient first elastomeric material, and said secondary member being made from a second resilient elastomeric material which is substantially less stiff than said first material, said axial flange portion of said primary member being received over and supported on said inner diameter thereof by the outer diameter portion of said spacer.

11. A combination as defined in claim 10 in which, when said bushing end face engages said spacer, said secondary member is deformed under an axial load applied to said primary seal ring by said bushing end face such that said front and rear surfaces of said secondary ring bulge outwardly and said parallelogram shaped cross section of said secondary ring is distorted so that said inner and outer diameter surfaces thereof are moved toward a position of radial alignment.

12. An end face seal as defined in claim 1, wherein said front surface portion of said radial flange of said primary sealing ring comprises a first surface and a second surface, said first surface being a generally planar, radially extending surface and said second surface being joined thereto along a common edge and being of frustoconical shape, said second surface being inclined radially outwardly and toward said mating surface.

13. An end face seal as defined in claim 12, wherein the angle between said first and said second surfaces, measured exteriorly thereof, is from about 140° to about 165°.

* * * * *